United States Patent
Fontbonne et al.

(10) Patent No.: US 7,154,097 B2
(45) Date of Patent: Dec. 26, 2006

(54) METHOD FOR MEASURING A DOSE OF IRRADIATION WITH A BEAM OF IONIZING RADIATION CAPABLE OF CREATING CHERENKOV RADIATION

(75) Inventors: Jean-Marc Fontbonne, Caen (FR); Bernard Tamain, Epron (FR); Joël Tillier, Caen (FR); Gilles Iltis, Herouville (FR); Christian Le Brun, Caen (FR); Gilles Ban, Mathieu (FR)

(73) Assignee: Centre National de la Recherche Scientifique (CNRS), Paris (FR)

( * ) Notice: Subject to any disclaimer, the term of this patent is extended or adjusted under 35 U.S.C. 154(b) by 176 days.

(21) Appl. No.: 10/471,734

(22) PCT Filed: Mar. 15, 2002

(86) PCT No.: PCT/FR02/00932

§ 371 (c)(1),
(2), (4) Date: Jul. 9, 2004

(87) PCT Pub. No.: WO02/075359

PCT Pub. Date: Sep. 26, 2002

(65) Prior Publication Data

US 2004/0238749 A1     Dec. 2, 2004

(30) Foreign Application Priority Data

Mar. 15, 2001 (FR) .................................. 01 03519

(51) Int. Cl.
*G01T 1/20* (2006.01)
(52) U.S. Cl. ....................................................... 250/368
(58) Field of Classification Search ................. 250/368

See application file for complete search history.

(56) References Cited

U.S. PATENT DOCUMENTS

| 3,718,818 A | 2/1973 | von Arx et al. |
| 5,087,818 A | 2/1992 | Bellian et al. |

FOREIGN PATENT DOCUMENTS

| EP | 0 608 101 A2 | 7/1994 |
| JP | 2001-56381 A | 2/2001 |

OTHER PUBLICATIONS

M. A. Clift, R. A. Sutton, and D. V. Webb, "Dealing with Cerenkov radiation generated in organic scintillator dosimeters by bremsstrahlung beams." Phys. Med. Biol., vol. 45, No. 5 (Institute of Physics Publishing on behalf of the Institute of Physics and Engineering in Medicine, May 2000) pp. 1165-1182.*

* cited by examiner

*Primary Examiner*—Constantine Hannaher
(74) *Attorney, Agent, or Firm*—Heller Ehrman LLP

(57) ABSTRACT

A method for measuring a dose of irradiation with a beam of ionizing radiation capable of creating Cherenkov radiation, in which a scintillator for emitting scintillation light, whose intensity is a function of the dose of this beam irradiating this scintillator, is arranged below this beam, the scintillator is coupled, via an optical fiber, to a device for measuring the light emitted by the scintillator, and the quantity of light transmitted by the optical fiber is measured, is described. The light emerging from the opposite end of the optical fiber is filtered using two bandpass filters having cutoff bands in different parts of the spectrum, the intensity of the light coming from these two filters is measured a plurality of times, and the pluralities of quantities of scintillation light and Cherenkov radiation are calculated on the basis of these measurements to deduce a first irradiation dose value.

3 Claims, 2 Drawing Sheets

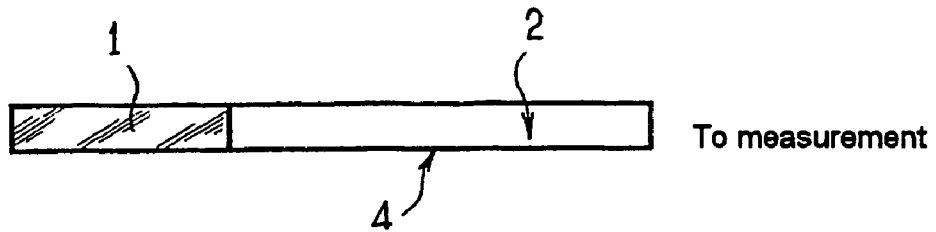
FIG_1
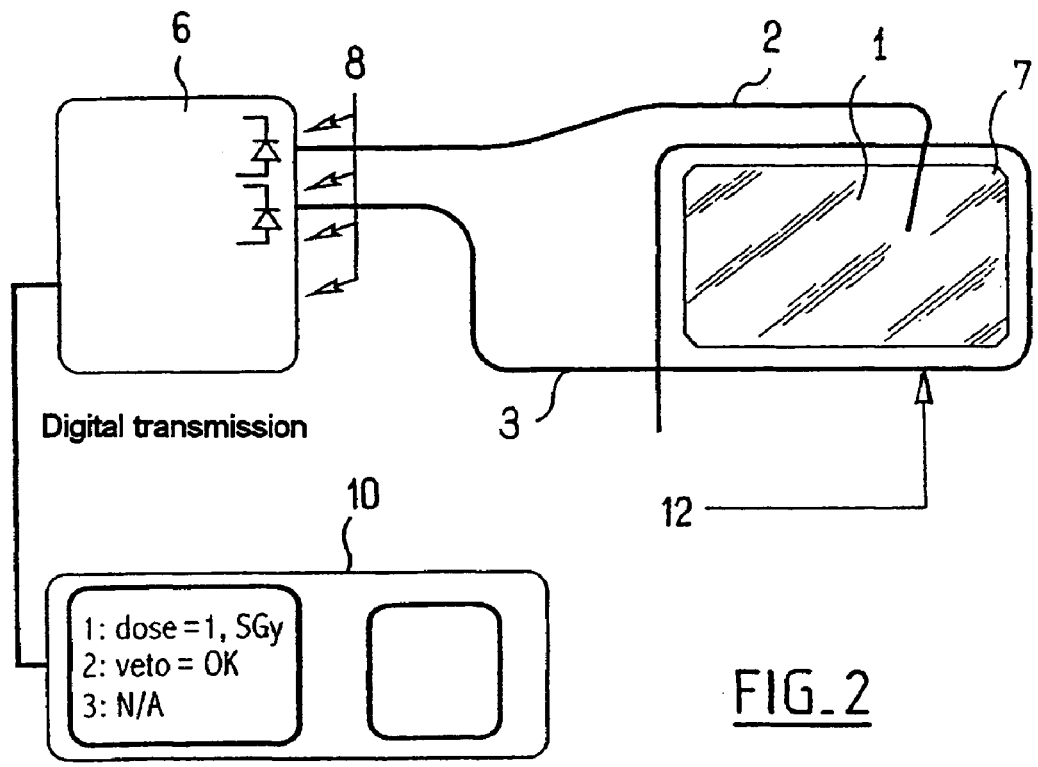
FIG_2
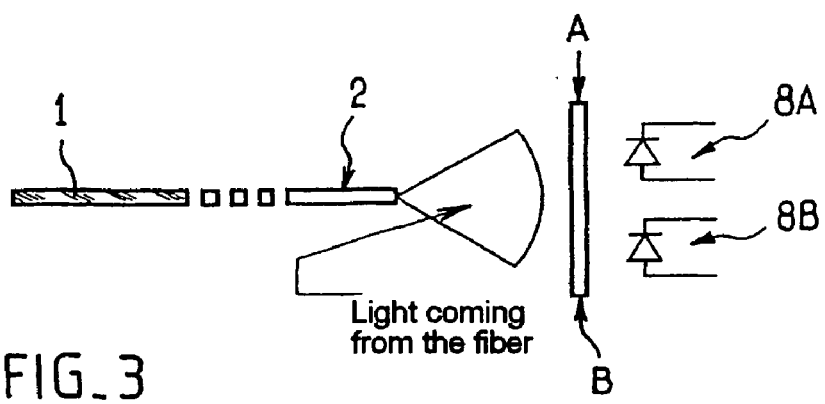
FIG_3

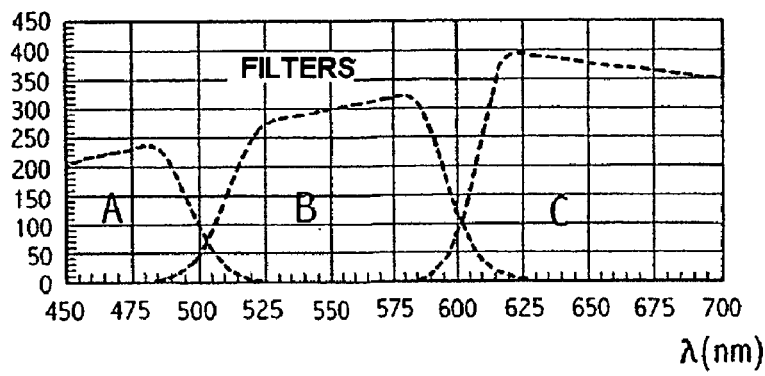
FIG_4
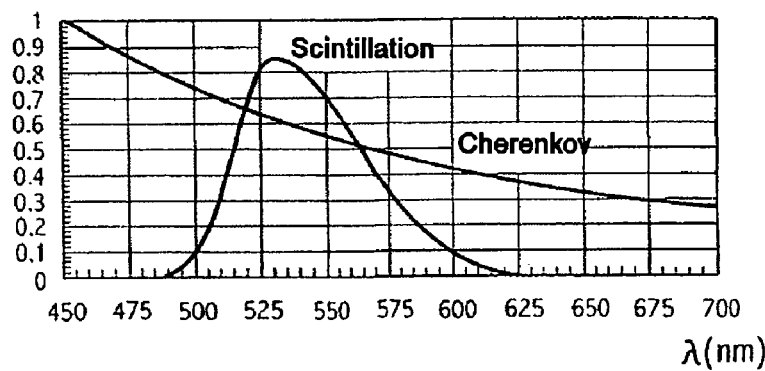
FIG_5
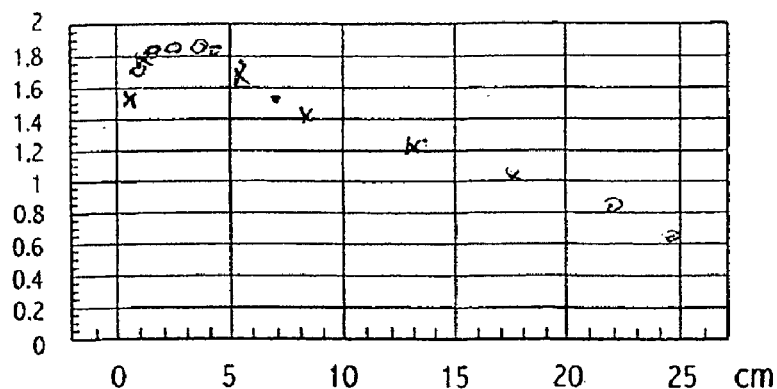
x = ionization chamber
o = scintillator
FIG_6

METHOD FOR MEASURING A DOSE OF IRRADIATION WITH A BEAM OF IONIZING RADIATION CAPABLE OF CREATING CHERENKOV RADIATION

The invention relates to the field of measuring doses of irradiation with a beam of ionizing radiation.

This type of method is, for example, used to monitor the irradiation of patients for therapeutic purposes. In this type of application, the irradiation of the patient is carried out after prior positioning of the patient and suitable delimitation of the irradiation beam. The latter generally originates from an electron accelerator used to generate a beam of bremsstrahlung photons. If the patient moves during the irradiation, sensitive organs may be damaged. It is therefore important to provide sophisticated means of monitoring the irradiation.

Silicon detectors have often been used to carry out this irradiation monitoring. These, however, age very quickly and are often bulky.

In order to overcome these drawbacks, detectors with a scintillating fiber have been developed.

Methods of using such detectors are hence known, in particular from the document "Direct reading measurement of absorbed dose with plastic scintillators—The general concept and applications to ophtalmic plaque dosimetry", D. Flühs, M. Heintz, F. Indenkämpen, C. Wieczorek, H. Kolanoski and U. Quast, Med. Phys. 23 (3), Mar. 1996, p. 427.

According to this type of method, doses of irradiation with a beam of high-energy radiation are measured in the following way:
- a scintillator for emitting scintillation light, whose intensity is a function of the dose of this beam irradiating this scintillator, is arranged below this beam,
- the scintillator is coupled, via an optical fiber, to a device for measuring the light emitted by the scintillator, and
- the quantity of light transmitted by the optical fiber is measured.

This type of method, however, encounters a major difficulty:
- discrimination between the Cherenkov effect (parasitic effect) and the scintillation (useful signal).

It is an object of the invention, in particular, to overcome this drawback in order to measure the intensity of the light emitted by the scintillator.

This object is achieved by using a method as claimed in claim 1 and a device as claimed in claim 3.

Specifically, the Cherenkov effect is produced by secondary electrons with high energy (more than 200 KeV). Cherenkov radiation generates light with a bluish appearance in transparent media. This light covers the full spectrum of light. The quantity of light produced in the scintillator and in the optical fiber follows a law of the type:

$$dQ \propto \frac{1}{\lambda^2} d\lambda dL$$

where $\lambda$ represents the wavelength and L represents the irradiated length of fiber (scintillating or not).

During a radiotherapy session, the light produced in the optical fiber will therefore have two different origins (see FIG. 1):
- scintillation, proportional only to the delivered dose and with a defined wavelength and
- Cherenkov radiation, proportional to the delivered dose and to the irradiated length of fiber.

The light produced by the scintillator and that produced by the Cherenkov effect have different sources and possess different spectral ranges (see FIG. 5). They are transmitted by the same optical fiber. However, the light produced by the Cherenkov effect and that produced by the scintillation are mutually decorrelated. It is therefore possible to ascertain each contribution biuniquely by using two measurements in different parts of the spectrum. It is hence possible to determine the intensity of the light emitted by the scintillator when the light emitted by another source corresponds to the Cherenkov radiation emitted by the secondary electrons produced by the irradiation.

Other aspects objects and advantages of the invention will become apparent on reading the detailed description of an example of an embodiment of the method according to the invention and an example of an embodiment of the device according to the invention. The invention will also be understood more clearly with the aid of the references to the drawings, in which:

FIG. 1 schematically represents a longitudinal section of an optical fiber and a scintillator with which an irradiation dosimeter device according to the invention may be equipped;

FIG. 2 schematically represents an example of an irradiation dosimeter device according to the invention;

FIG. 3 schematically represents a variant of the detection part of the measurement device represented in FIG. 2;

FIG. 4 is a diagram of the sensitivity of the photodetectors of the detection part represented in FIG. 3, as a function of the wavelength $\lambda$ of the light transmitted by the filter fitted to each photodetector;

FIG. 5 is a diagram of the light energy emitted by the scintillator of the device represented in FIG. 2 and by the Cherenkov effect, as a function of the wavelength $\lambda$;

FIG. 6 is a diagram of the dose delivered by irradiation and measured by using an ionization chamber or by using the device represented in FIG. 2 (0), as a function of the penetration into a phantom for calibrating the device.

The invention is illustrated below with the aid of an example of a method and device taken from the field of radiotherapy.

As represented in FIG. 1, this example of a device for measuring irradiation doses according to the invention includes a scintillator 1 and an optical fiber 2.

The scintillator 1 consists of a cylinder of scintillating fiber with a diameter of 1 mm and length of 10 millimeters. This length may be adjustable. The scintillating fiber is made of special plastic. It may be the fiber referenced BCF60 by the company Bicron® which markets it. In this case, the core of the fiber is made of polystyrene and the cladding is made of polymethyl methacrylate (PMMA). It produces green light whose intensity is proportional to the irradiation dose delivered above and to its irradiated length.

The small size of the scintillator 1 makes it an ideal tool for probing a precise point of the patient being treated. It may furthermore be introduced in a catheter to measure doses delivered inside the subject being treated.

The scintillator 1 is coupled to the optical fiber 2. The optical fiber 2 is a plastic fiber. It may be the fiber referenced EH4001 by the company Mitsubishi which markets it. In this case, it is a PMMA fiber whose core measures 1 mm in diameter and whose cladding measures 2.2 mm in diameter. Its attenuation is 0.15 dB/meter.

The scintillator 1 and a part of the optical fiber 2 are stripped before being introduced into a sheath 4.

As represented in FIG. 2, the optical fiber 2 is arranged so that the scintillator 1 lies overall at the center of the region 7 to be treated or monitored. It is connected to an electronic device 6. This electronic device 6 includes photodiodes 8 acting as photodetectors for measuring any light which may be transmitted by a plurality of optical fibers.

The signals produced by the photodiodes 8 are then amplified with a view to utilizing them. They are then transmitted digitally to acquisition electronics 10.

For some measurements, a longer scintillating fiber 12 is arranged around the irradiated region outside which no dose is intended to be delivered. This makes it possible to check that the irradiation is indeed taking place in the region 7 to be treated, but not outside. It is coupled to an optical fiber 3, itself connected to photodiodes 8 of the electronic device 6, for processing in the acquisition electronics 10.

The irradiation is produced, for example, by an accelerator which delivers the irradiation dose in the form of a beam of X-rays or electrons, depending on the treatment in question. In any event, the X-ray photons deliver their energy via the electrons which are produced, for example, in the patient by photoelectric effect, Compton effect or pair creation. Only the effect of the electrons will be considered below.

As represented in FIG. 3, the light coming from the optical fiber 2 is filtered through two colored filters A and B. A photodiode 8A or 8B is placed behind each colored filter A or B.

As represented in FIG. 4, each of the two colored filters A, B transmits a different part of the light spectrum. One of these colored filters A, B is a blue bandpass filter, while the other is a yellow bandpass filter. The cutoff band of these filters is selected as a function of the components of the light coming from the optical fiber 2.

As represented in FIG. 5, the light coming from the optical fiber 2 contains a component due to the scintillation produced by the scintillator 1 and a component due to the Cherenkov effect.

It will be noted when comparing FIGS. 4 and 5 that filter A mainly transmits the light emitted by the Cherenkov effect, while filter B transmits both the light emitted by the Cherenkov effect and that emitted by the scintillator 1.

According to the invention, the intensity of the light emitted by the scintillator 1 is determined on the basis of the intensity of the light by the optical fiber 2.

If:

C is the quantity of Cherenkov light produced for a dose $D_L$ over a fiber length L, S is the quantity of scintillation light produced for a delivered dose D, $k_A^S$ is the modulation of the spectrum of the scintillation light by the filter A, $k_B^S$ is the modulation of the spectrum of the scintillation light by the filter B, $k_A^C$ is the modulation of the spectrum of the Cherenkov light by the filter A, $k_B^S$ is the modulation of the spectrum of the Cherenkov light by the filter B, $M_A$ is the quantity of light received on the photodiode 8A, $M_B$ is the quantity of light received on the photodiode 8B, then the following relationships apply:

$$M_A = k_A^S \cdot S + k_A^C \cdot C, \text{ and}$$

$$M_B = k_B^S \cdot S + k_B^C \cdot C,$$

or, in matrix form:

$$\begin{pmatrix} M_A \\ M_B \end{pmatrix} = \begin{pmatrix} k_A^S & k_A^C \\ k_B^S & k_B^C \end{pmatrix} \cdot \begin{pmatrix} S \\ C \end{pmatrix}, \quad \begin{pmatrix} k_A^S & k_A^C \\ k_B^S & k_B^C \end{pmatrix}$$

also being referred to as the K matrix and $$\begin{pmatrix} M_A \\ M_B \end{pmatrix}$$

also being referred to as the M vector.

The matrix $M_A$ is not singular if the filters A and B are chosen correctly. This is the case, in particular, if one is a blue bandpass filter and the other is a yellow bandpass filter. In this case, knowledge of the M vector makes it possible to biuniquely ascertain the quantity of scintillation light S and the quantity of Cherenkov light C and, by calibration, the delivered dose D.

The calibration is carried out by comparing the signal received by the scintillator 1 with the signal produced in a reference ionization chamber placed in proximity.

It consists simply in varying the quantity of Cherenkov radiation at least at two measurement points, and in adjusting the coefficients for ascertaining the dose by means of a least squares method.

A relationship of the following type is therefore looked for:

$$D = \alpha M_A + \beta M_B$$

To this end, n measurements are taken and an observation system is obtained:

$$\begin{pmatrix} D^1 \\ \vdots \\ D^n \end{pmatrix} = \begin{pmatrix} M_A^1 & M_B^1 \\ \vdots & \vdots \\ M_A^n & M_B^n \end{pmatrix} \cdot \begin{pmatrix} \alpha \\ \beta \end{pmatrix}$$

and the vector of unknowns $\alpha$ and $\beta$ is then determined in the following way:

$$\begin{pmatrix} \alpha \\ \beta \end{pmatrix} = (M^T \cdot M)^{-1} \cdot M^T \cdot D,$$

where $M^T$ is the transpose matrix of the matrix M

These coefficients $\alpha$ and $\beta$ may then subsequently be used to make calculations of the delivered dose as a function of the measured dose.

After calibration, a series of results obtained with the scintillator 1 was compared with a series of measurements obtained directly with the aid of an ionization chamber. For the latter, the measurements correspond to a depth yield in a water tank generating 15 MV X-rays outputting 2 Gy.min$^1$ delivering at the isocenter.

The invention claimed is:

1. A method for measuring a dose of irradiation with a beam of ionizing radiation capable of creating Cherenkov radiation, in which a scintillator (1) for emitting scintillation light, whose intensity is a function of the dose of this beam irradiating this scintillator (1), is arranged below this beam, the scintillator (1) is coupled, via an optical fiber (2), to a device (8) for measuring the light emitted by the scintillator (1), and the quantity of light transmitted by the optical fiber (2) is measured, wherein the light emerging from the opposite end of the optical fiber (2) from the one coupled to the scintillator (1) is filtered using two bandpass filters having cutoff bands in different parts of the spectrum, the intensity of the light coming from these two filters is measured, a plurality of times, and wherein a plurality of quantities of scintillation light and Cherenkov radiation are calculated on the basis of the plurality of measurements in order to deduce a first irradiation dose value therefrom.

2. A device for measuring a dose of irradiation with a beam of high-energy radiation, comprising a scintillator (1) for emitting scintillation light, whose intensity is a function of the dose of this beam irradiating this scintillator (1), and an optical fiber (2) for transmitting the light emitted by the scintillator (1) to a device (8) for measuring the intensity of this light, characterized in that it comprises at least two filters having cutoff bands in different parts of the spectrum, as well as means for measuring a plurality of times the scintillation light and the Cherenkov radiation together in at least two different parts of the spectrum, at the output of these two filters, means for calculating a plurality of quantities of scintillation light and Cherenkov radiation on the basis of the plurality of measurements, and processing means for deducing a first irradiation dose value therefrom.

3. The device as claimed in claim 2, wherein it comprises a photodetector (8) arranged behind each bandpass filter for measuring the light coming from the optical fiber (2) and filtered by each of the bandpass filters.

* * * * *